(12) United States Patent
Cherepinsky et al.

(10) Patent No.: US 7,930,074 B2
(45) Date of Patent: Apr. 19, 2011

(54) VERTICAL SPEED AND FLIGHT PATH COMMAND MODULE FOR DISPLACEMENT COLLECTIVE UTILIZING TACTILE CUEING AND TACTILE FEEDBACK

(75) Inventors: Igor Cherepinsky, Sandy Hook, CT (US); Michael R. Skaggs, Southbury, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 1065 days.

(21) Appl. No.: 11/687,739

(22) Filed: Mar. 19, 2007

(65) Prior Publication Data

US 2008/0234881 A1  Sep. 25, 2008

(51) Int. Cl.
   *G05D 1/08* (2006.01)
(52) U.S. Cl. .............. 701/12; 701/8; 701/7; 244/17.23; 244/17.11; 244/75.1; 244/7 R
(58) Field of Classification Search ............. 701/7–8, 701/12; 244/7 A, 8, 17.1, 17.13, 221, 181, 244/6, 17.23, 7 R, 17.11, 76 R, 75.1
See application file for complete search history.

(56) References Cited

U.S. PATENT DOCUMENTS

| | | | | |
|---|---|---|---|---|
| 2,833,496 A | * | 5/1958 | McRuer et al. | 244/196 |
| 3,027,841 A | * | 4/1962 | Dixson | 244/3.18 |
| 3,179,352 A | * | 4/1965 | Nelson | 244/7 C |
| 4,228,737 A | * | 10/1980 | Kahn et al. | 102/384 |
| 4,500,967 A | * | 2/1985 | Murphy et al. | 701/12 |
| 4,780,838 A | | 10/1988 | Adelson | |
| 5,031,858 A | * | 7/1991 | Schellhase et al. | 244/7 R |
| 5,213,282 A | | 5/1993 | Gold et al. | |
| 5,310,136 A | | 5/1994 | Fowler et al. | |
| 5,446,666 A | * | 8/1995 | Bauer | 701/4 |
| 5,465,212 A | | 11/1995 | Fowler et al. | |
| 5,727,754 A | * | 3/1998 | Carter, Jr. | 244/8 |
| 6,128,554 A | | 10/2000 | Damotte | |

(Continued)

FOREIGN PATENT DOCUMENTS

CA  2189455 C  * 2/2003

(Continued)

OTHER PUBLICATIONS

Manuallly flown windshear recovery technique; Kupcis, E.A.; Decision and Control, 1990., Proceedings of the 29th IEEE Conference on; Digital Object Identifier: 10.1109/CDC.1990.203689; Publication Year: 1990, pp. 758-759 vol. 2.*

Doyle R S et al: "Multi-sensor data fusion for helicopter guidance using neuro-fuzzy estimation algorithms" Systems, Man and Cybernetics, 1995. Intelligent Systems for the 21.sup.st Century., IEEE International Conference on Vancouver, BC, Canada Oct. 22-25, 1995, New York, NY, USA, IEEE, US, Oct. 22, 1995, pp. 1392-1397, XP010194472 ISBN: 0-7803-2.*

(Continued)

*Primary Examiner* — Cuong H Nguyen
(74) *Attorney, Agent, or Firm* — Carlson Gaskey & Olds PC

(57) ABSTRACT

A flight control system includes a collective position command module for a lift axis (collective pitch) which, in combination with an active collective system, provides a force feedback such that a pilot may seamlessly command vertical speed, flight path angle or directly change collective blade pitch. The collective position command module utilizes displacement of the collective controller to command direct collective blade pitch change, while a constant force application to the collective controller within a "level flight" detent commands vertical velocity or flight path angle. The "level flight" detent provides a tactile cue for collective position to reference the aircraft level flight attitude without the pilot having to refer to the instruments and without excessive collective controller movement.

21 Claims, 5 Drawing Sheets

U.S. PATENT DOCUMENTS

| | | | | |
|---|---|---|---|---|
| 6,142,421 | A * | 11/2000 | Palmer | 244/135 B |
| 6,145,428 | A | 11/2000 | Gold et al. | |
| 6,260,797 | B1 * | 7/2001 | Palmer | 244/49 |
| 6,477,448 | B1 | 11/2002 | Maruyama | |
| 6,591,169 | B2 | 7/2003 | Jones et al. | |
| 6,629,298 | B1 | 9/2003 | Camporese et al. | |
| 6,648,269 | B2 | 11/2003 | Gold et al. | |
| 6,679,458 | B2 | 1/2004 | Einthoven et al. | |
| 6,711,476 | B2 | 3/2004 | Jones et al. | |
| 6,814,330 | B2 | 11/2004 | Jones et al. | |
| 7,109,430 | B2 * | 9/2006 | Horton et al. | 200/296 |
| 7,275,711 | B1 * | 10/2007 | Flanigan | 244/17.11 |
| 7,433,765 | B2 * | 10/2008 | Fanciullo et al. | 701/3 |
| 7,438,259 | B1 * | 10/2008 | Piasecki et al. | 244/6 |
| 2002/0003188 | A1 * | 1/2002 | Moshier | 244/4 R |
| 2006/0253230 | A1 * | 11/2006 | Fanciullo et al. | 701/3 |
| 2008/0097658 | A1 * | 4/2008 | Shue et al. | 701/8 |
| 2008/0234881 | A1 * | 9/2008 | Cherepinsky et al. | 701/7 |
| 2008/0237392 | A1 * | 10/2008 | Piasecki et al. | 244/6 |
| 2009/0048722 | A1 * | 2/2009 | Piasecki et al. | 701/3 |
| 2009/0101752 | A1 * | 4/2009 | Mock et al. | 244/3.24 |

FOREIGN PATENT DOCUMENTS

| | | | |
|---|---|---|---|
| EP | 1559121 A1 * | 8/2005 | |
| EP | 2134598 A2 * | 12/2009 | |
| EP | 2203706 A1 * | 7/2010 | |
| WO | WO 9530181 A1 * | 11/1995 | |
| WO | WO 2004044938 A1 * | 5/2004 | |
| WO | WO 2008137217 A2 * | 11/2008 | |
| WO | WO 2008137217 A3 * | 3/2009 | |
| WO | WO 2009051865 A1 * | 4/2009 | |

OTHER PUBLICATIONS

Menn, "Digital Let-down Computer for Vertical Guidance," IEEE Transactions on Computers (vol. C-18, No. 11), Nov. 1969, p. 1065.*

Flight control of a Rotary wing UAV using adaptive backstepping; Ahmed, B.; Pota, H.R.; Control and Automation, 2009. ICCA 2009. IEEE International Conference on; Digital Object Identifier: 10.1109/ICCA.2009.5410398; Publication Year: 2009, pp. 1780-1785.*

Flight control of a rotary wing UAV—a practical approach; Ahmed, B.; Pota, H.R.; Garratt, M.; Decision and Control, 2008. CDC 2008. 47th IEEE Conference on; Digital Object Identifier: 10.1109/CDC.2008.4738917; Publication Year: 2008, pp. 5042-5047.*

Real-time indoor autonomous vehicle test environment; How, J.P.; Bethke, B.; Frank, A.; Dale, D.; Vian, J.; Control Systems Magazine, IEEE; vol. 28, Issue: 2; Digital Object Identifier: 10.1109/MCS.2007.914691; Publication Year: 2008, pp. 51-64.*

Modeling and control of the heart left ventricle supported with a rotary assist device ; Simaan, M.A.; Decision and Control, 2008. CDC 2008. 47th IEEE Conference on; Digital Object Identifier: 10.1109/CDC.2008.4739226; Publication Year: 2008, pp. 2656-2661.*

Aeronautical Design Standard Performance Specification Handling Qualities Requirements for Military Rotorcraft, Feb. 29, 2000.

PCT International Search Report and written opinion mailed Jan. 14, 2009.

* cited by examiner

VERTICAL SPEED AND FLIGHT PATH COMMAND MODULE FOR DISPLACEMENT COLLECTIVE UTILIZING TACTILE CUEING AND TACTILE FEEDBACK

This invention was made with government support under Contract No.: W58RGZ-06-D-0045 awarded by the Department of the Army. The government therefore has certain rights in this invention.

BACKGROUND OF THE INVENTION

The present invention relates to flight control systems for rotary-wing aircraft with force feedback (active) collective systems, and more particularly to a flight control system which provides a low pilot-workload collective control system.

Demand for low pilot-workload helicopters continues to increase. With the establishment of ADS-33 as the dominant handling qualities specification, the rotorcraft industry has been pursuing various methods to provide advanced flight control features. One primary method of compliance with ADS-33 is employment of a Fly-By-Wire (FBW) flight control system to decouple pilot inputs and aircraft dynamics.

Several ADS-33 requirements relate to high vertical stability and precise command of vertical velocity. Unlike cyclic control, which in FBW system can be a "unique trim" controller (i.e. cyclic controller position does not directly represent swash plate angle), collective control has to maintain a more direct relationship to collective blade pitch. This piloting requirement complicates implementation of a collective controller with vertical augmentation. Below is a summary of current methods that implement additional vertical augmentation.

One current method that implements additional vertical augmentation includes the addition of a trim actuator to the collective axis as is typical of autopilots and some FBW systems. The pilot utilizes a trim actuator control such as a knob separate from the collective controller to enter a desired vertical velocity, altitude, etc. This method provides limited benefit to handling qualities, since the pilot does not directly command desired aircraft state. Should the pilot command collective directly, the trim actuator is overridden. This method necessarily limits slew rate of the trim actuator to prevent failure propagation.

Another current method that implements additional vertical augmentation includes the addition of a trim actuator and an inner loop servo typical of some autopilots and some FBW systems. This method is similar to the method described above, except it includes an additional actuator (in case of a mechanical flight control system) or an additional collective feed-forward path (in case of a FBW system). Low frequency commands are passed to the trim actuator and high frequency commands are passed to the inner-loop. This method provides some additional vertical augmentation when pilot is restraining/moving collective, but overall still suffers from the drawbacks described above.

Another current method that implements additional vertical augmentation includes the addition of a trim actuator and an additional separate vertical controller. In this method, the pilot moves the collective controller to input blade pitch commands directly into the rotor system. The pilot then moves a sidearm controller up and down to command aircraft vertical speed (instead of direct command of blade pitch). This method does meet ADS-33 requirements, but requires coordination between left and right hand, since small inputs are made with the right hand (into the sidearm controller) and large inputs are made with the left hand (collective controller). Adding this degree of freedom to the sidearm controller may also be prone to coupling which complicates single axis inputs. The pilot also has to be sure that the collective controller is unrestrained during inputs into the sidearm controller since inputs into the sidearm controller (through the FBW system) commands the trim actuator and displaces the collective controller.

Another current method that implements additional vertical augmentation utilizes an active inceptor system such as Boeing's Helicopter Advanced Control Technology (HACT) simulation This system allows force feedback, position feedback and some feedback on vertical aircraft state, but does not use force command as a pilot input. Instead, a "split-detent" feature where the detent is "stretched" or split operates to cue the pilot to two different aircraft conditions. This allows "level-flight" cueing, but if the pilot desires to command vertical speed, a displacement input is required. During this displacement input, additional augmentation is not provided. Since force is not utilized to command a different aircraft state, additional vertical axis augmentation is not provided when the pilot is flying "in-the-loop."

Accordingly, it is desirable to provide force feedback as commanded by a flight control system such that pilots may seamlessly command vertical speed, flight path angle or directly change collective blade pitch.

SUMMARY OF THE INVENTION

The flight control system according to the present invention includes a collective position command module for a lift axis (collective) applicable to rotary wing-aircraft with a force feedback (active) collective systems. The collective position command module, in combination with the active collective system, provides force feedback such that pilots may seamlessly command vertical speed, flight path angle or directly change collective blade pitch.

The basic premise of the collective position command module is that displacement of the collective controller commands collective blade pitch, but a constant force within a "level flight" detent commands vertical velocity or flight path angle depending on aircraft mode. Force feedback on the collective controller to provide the feeling of the "level flight" detent cues the position of an aircraft level flight state without the pilot having to refer to the instruments or make excessive collective adjustment.

Once the pilot places the collective control in the "level flight" detent, the flight control system automatically acquires altitude reference and holds this reference by adjusting the position of "level flight" detent and the collective control. Since the collective control is in the middle of the "level flight" detent, the collective controller moves with the "level flight" detent while the aircraft holds desired altitude.

The "level flight" detent is dynamically positioned as the active collective system maintains the aircraft in level flight. When no force is applied, the collective controller remains in the middle of the "level flight" detent. In other words, the active collective system maintains the aircraft in level flight while the collective position command module accordingly adjusts the "level flight" detent position such that the collective controller remains within the dynamically adjusted "level flight" detent.

Should the pilot wish to command vertical speed (or flight path climb/dive angle at high speed), the pilot applies a constant force within the "level flight" detent, without moving the collective controller out of the "level flight" detent. This action commands vertical speed (flight path angle if at high speed) proportional to the amount of force applied to the collective controller.

Should the pilot wish to change the collective blade pitch directly, the pilot displaces the collective controller out of the "level flight" detent. Outside of the "level flight" detent, collective blade pitch is generally proportional to collective controller position.

The collective position command module also monitors the collective controller velocity such that should the pilot hold the collective controller outside of the "level flight" detent for a predetermined time (such as 1 second), the collective position command module acquires a flight path angle reference and generate a "flight path hold" detent to hold this reference. The collective controller thereafter remains within the "flight path hold" detent. From within the "flight path hold" detent, the pilot can make force inputs as described above, except that application of a constant force without moving the collective out of the "flight path hold detent" commands a change in the constant flight path rate to, for example, change the climb/dive angle.

Movement of the collective controller out of the "flight path hold detent" again directly commands collective blade pitch. It should be noted that the "level flight" detent is still being computed, so that the pilot may move the collective controller out of the "flight path hold detent" and place the collective into the "level flight" detent to level-off the aircraft without reference to instruments or excessive collective adjustment.

Applicant has determined through piloted simulations that the present invention provides a significant increase in handling qualities, reduction in pilot workload and an increase in situation awareness. This module may alternatively be utilized for ground proximity cueing, brownout mitigation and other force feedback situations.

The present invention therefore provides force feedback as commanded by a flight control system such that pilots may seamlessly command vertical speed, flight path angle or directly change collective blade pitch.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows.

DETAILED DESCRIPTION OF THE DISCLOSED EMBODIMENT

Figure 1:
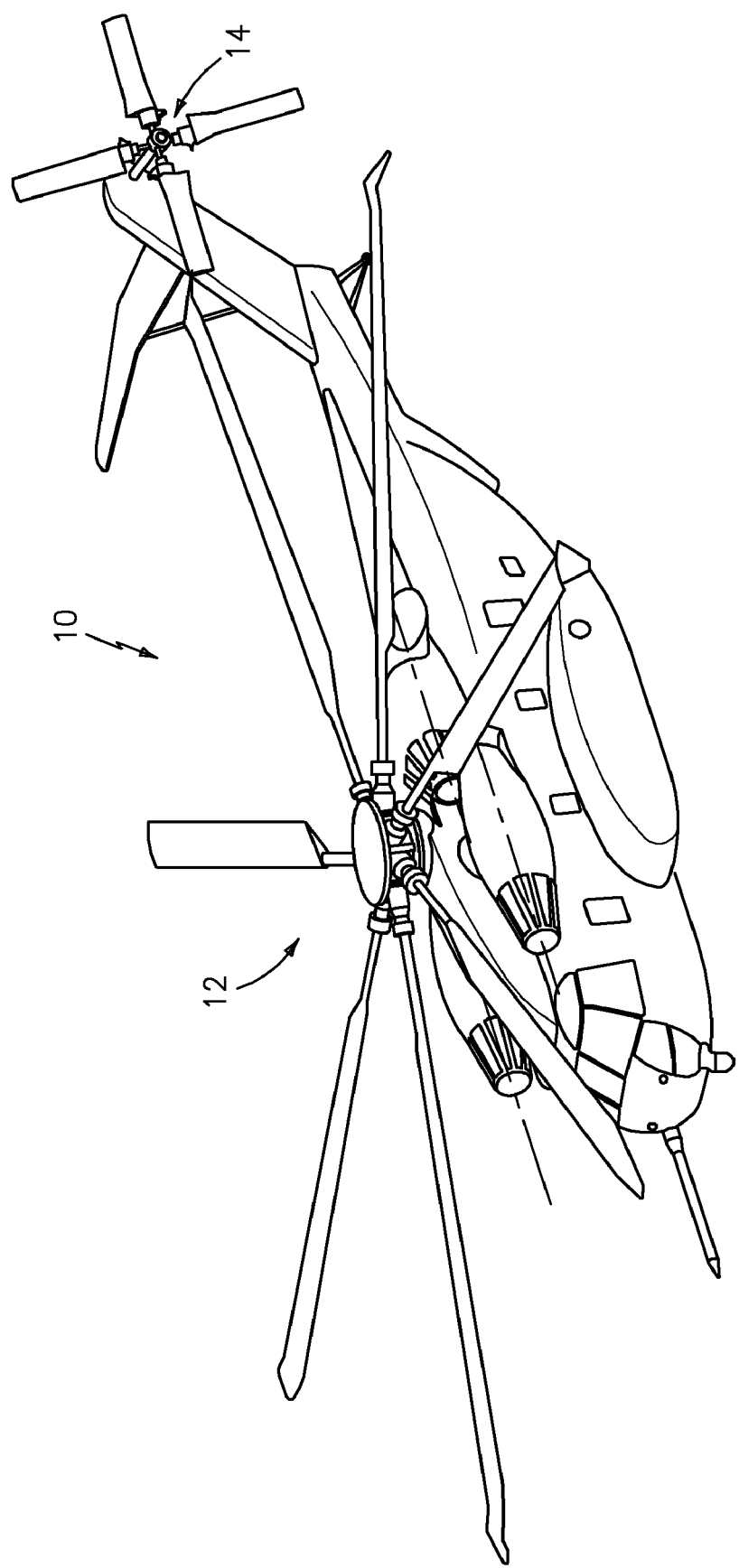
FIG. 1 is a general perspective view an exemplary rotary wing aircraft embodiment for use with the present invention.

FIG. 1 illustrates a general perspective view of a helicopter embodiment 10 of a rotary wing aircraft for use with the present invention. The helicopter includes a main rotor assembly 12 and tail rotor assembly 14. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from the present invention.

Figure 2:
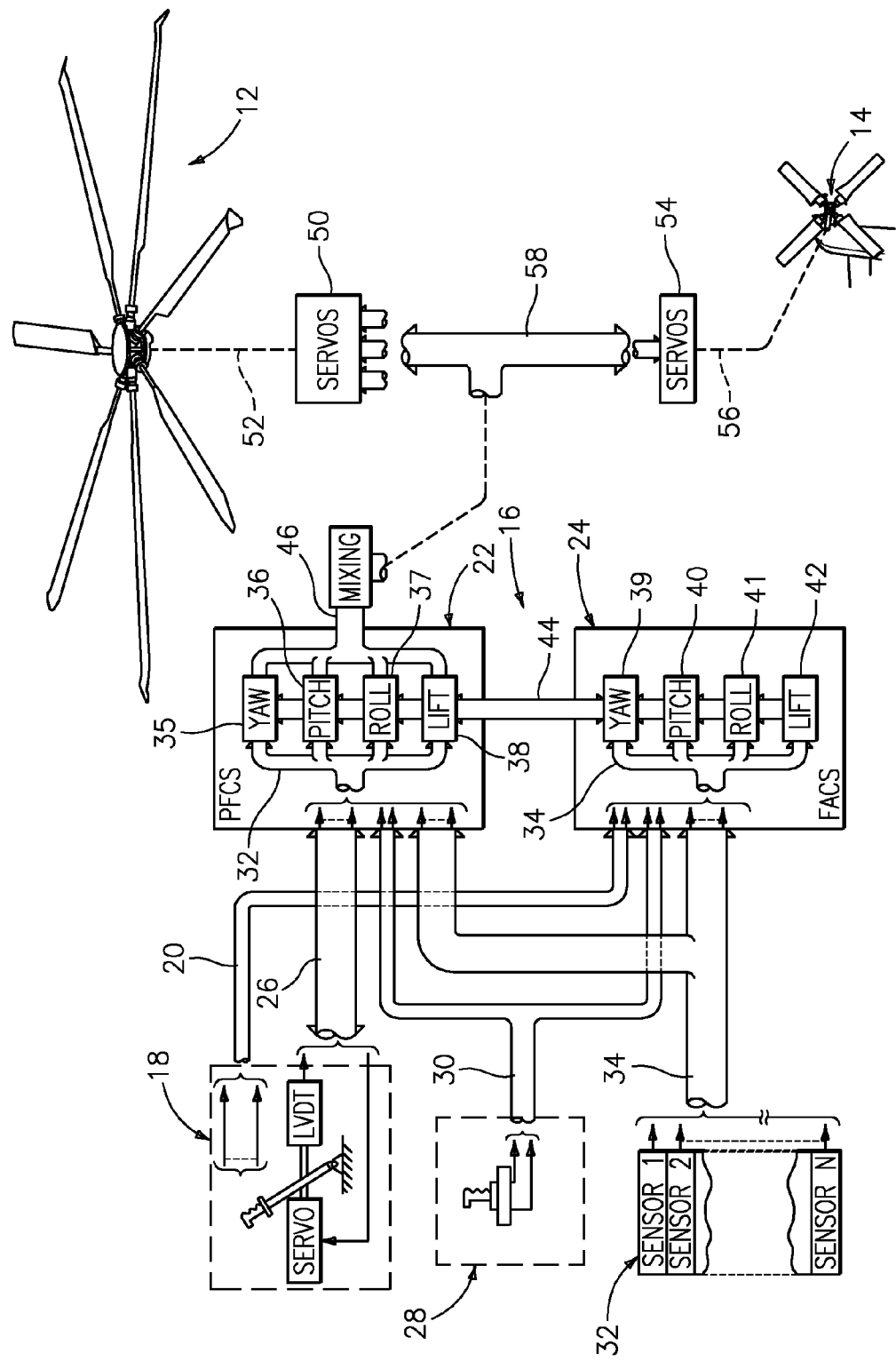
FIG. 2 is a block diagram of a flight control system for use with the present invention.

Referring to FIG. 2, the flight control system 16 includes a model following control system which shapes the pilot's controller and displacement commands through an inverse vehicle model to produce the desired aircraft response. The system includes a Primary Flight Control System (PFCS) 22 and an Flight Augmentation and Cueing System (FACS) 24. The PFCS and FACS each receive the force output command signals of a collective controller 18 on line 20, a cyclic controller 28 on lines 30, and the aircraft's sensed parameter signals from sensors 32, on lines 34. The collective control 18 and the cyclic control 28 may take various forms including sidearm controllers or other such control controllers. The pilot command signals on lines 20, 26, 30 and the sensed parameter signals on lines 34 are shown consolidated within trunk lines 32 and 34 in the PFCS and FACS, respectively.

It should be understood that the reference herein to the term trunk lines is a figurative term for the collective signal pathways between the various elements of the system 16. As known to those skilled in the art, while the individual signal paths may be conductive wires which are bundled in trunks for purposes of utility and/or protection (the trunk lines may be shielded against both mechanical and electromagnetic interference), the trunks may equally well be digital signal busses.

The PFCS and FACS each contain separate control channel logic for controlling the yaw, pitch, roll and lift axes of the aircraft. The logic is included in the PFCS and FACS control modules (schematically represented by blocks 35-38 for the PFCS and blocks 39-42 for the FACS). The sensed parameter signals from aircraft sensors 32, on lines 34, provide the PFCS and FACS with the aircraft's angular rate and attitude response to the rotor command signals. The PFCS logic provides rotor command signals and the FACS logic provides conditioning and/or trimming of the PFCS four axis logic functions. The PFCS and FACS logic modules interconnect through bus 44 to provide rotor command signals on output lines 46 to a mixing function 48 which communicates commands on lines 58 for the displacement of servos 50 and linkages 52 to control the tip path plane of the main rotor 12. A mixed command signal is also provided on line 58 to the helicopter's tail rotor servos 54 which control the thrust of the tail rotor 14 through linkages 56.

Figure 3:
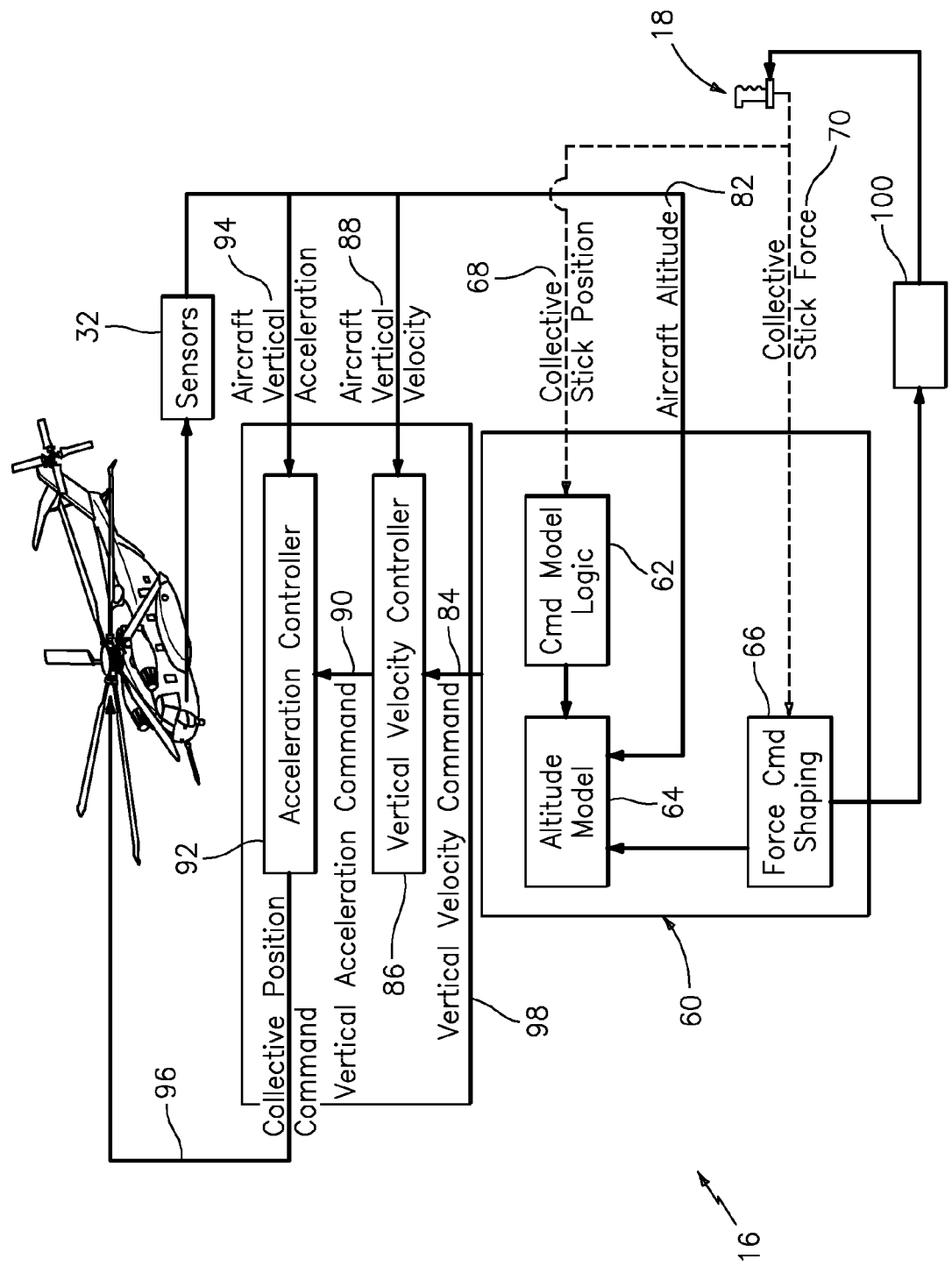
FIG. 3 is a block diagram of one embodiment of a collective position command module.

Referring to FIG. 3, a collective position command module 60 for the lift axis (collective) of the flight control system 16 is illustrated in a block diagrammatic view. The flight control system 16 utilizes model-following architecture to implement the collective position command module 60. The collective position command module 60 allows pilots the flexibility of commanding blade pitch directly or commanding vertical speed/flight path. The collective position command module 60 may be microprocessor based with a central processing unit, memory (RAM and/or ROM), with associated input and output buses, and/or may be a portion of a central vehicle main control system, an interactive vehicle dynamics module, or stand-alone controllers. Control modules are the scheme by which the decisions are made.

The collective position command module 60 generally includes command model logic 62, altitude model logic 64 and force command shaping logic 66. The collective position command module 60 receives various inputs such as a collective controller position 68, a collective controller force 70 and an aircraft altitude 82 to outputs a vertical velocity command 84 to a vertical velocity controller 86. The vertical velocity controller 86 receives an aircraft vertical velocity input 88 and outputs a vertical acceleration command 90 to an aircraft vertical acceleration controller 92. The vertical acceleration controller 92 receives an aircraft vertical acceleration input 94 and outputs a collective position command 96 to the appropriate servos 50 and linkages 52 to control the collective pitch of the main rotor 12. That is, sensed pilot force drives the vertical velocity model, which computes required vertical acceleration. Required vertical acceleration is passed into the acceleration controller, which computes required collective command.

The vertical velocity controller 86 and the aircraft vertical acceleration controller 92 generally define an active collective system 98. The active collective system 98 maintains a desired attitude without adjustment to the collective stick 18. Generally, the collective controller 18 position required to maintain a constant vertical velocity or constant altitude level flight is dynamic and a function of many factors such as vehicle velocity, acceleration, and atmospheric conditions as determined by the flight control system 16. The collective position command module 60 and the active collective system 98 commands collective pitch to the main rotor 12 while providing force feedback to the collective controller 18 to facilitate seamless pilot command of vertical speed, flight path angle and direct collective rotor blade pitch. The flight control system 16 is based on a concept of a displacement (conventional) collective controller 18, the only method of changing the collective blade pitch is by displacement of the collective controller 18.

The collective position command module 60 dynamically positions a "level flight" detent such that the pilot is always provided with a tactile cue where a level flight attitude is during current flight conditions. Displacement of the collective controller 18 commands collective blade pitch, but force (which may or may not include but a relatively insignificant displacement) commands vertical velocity (while the aircraft is in a low speed or hover flight mode) or flight path climb/dive angle (while the aircraft is in a high speed mode).

The force command shaping logic 66 emulates mechanical components such as springs and friction clutches through control of a force feedback actuation system 100 that includes actuators such as electric motors or other drives systems in communication with the collective controller 18. The force command shaping logic 66 commands the force feedback actuation system 100 to generate tactile cues to the pilot through the collective controller 18. The collective controller 18 provides tactile feedback to the pilot. Tactile feedback generally includes varying controller gradients, gates, detents, soft stops and the like through the force feedback actuation system 100.

The tactile cues includes a dynamically adjustable "level flight" detent such that the pilot perceives a spring tension or friction load on the collective controller 18 at the position of the detent. The vertical speed command subsystem utilizes a deep and sharp "level flight" detent to cue the pilot on commanded vertical speed. In this context, "deep and sharp" refers to the breakout force required to actually overcome the "level flight" detent. That is, the pilot can essentially apply force to the collective controller 18 without actually moving the collective controller 18 from within the "level-flight" detent. The force command shaping logic 66 senses this force and commands proportional vertical speed. Although the collective controller 18 is described in the illustrated embodiment to control vertical velocity and vertical position, altitude control controls for longitudinal, lateral or directional control of a vehicle may likewise benefit.

Figure 4:
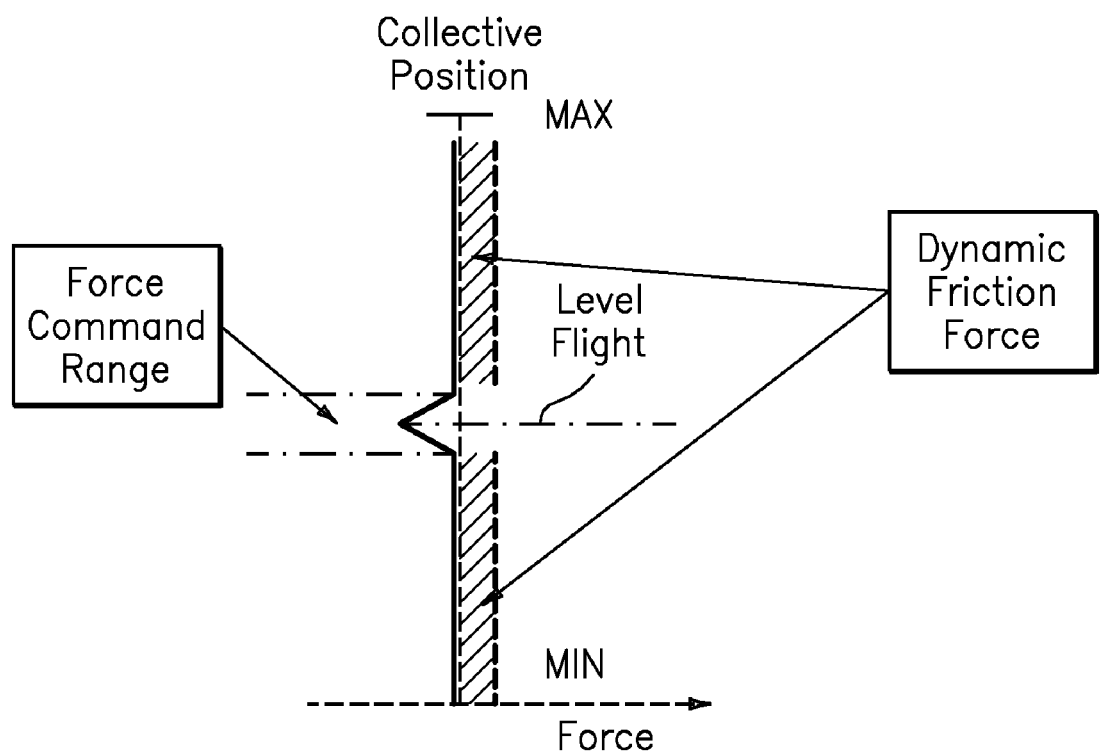
FIG. 4 is a force command range diagram of a collective position command module.

Referring to FIG. 4, the force command shaping logic 66 provides the feel of a detent—illustrated schematically in FIG. 4 by the "<" on the force command range diagram—on the collective controller 18. The "level flight" detent is dynamically adjusted by the collective position command module 60 to cue the pilot to the collective position equivalent to level flight attitude. The "level flight" detent provides the pilot with a tactile cue to the level flight attitude of the aircraft. When the pilot places collective in the "level flight" detent, the flight control system 16 automatically acquires an altitude reference from the aircraft's sensed parameter signals from sensors 32 such as radar, barometric, or other sensors depending on aircraft conditions and thereafter holds that level flight attitude through the active collective system 98. The collective position command module 60 also continuously calculates and dynamically adjusts the position of the "level flight" detent.

Figures 5, 6, 7, 8:
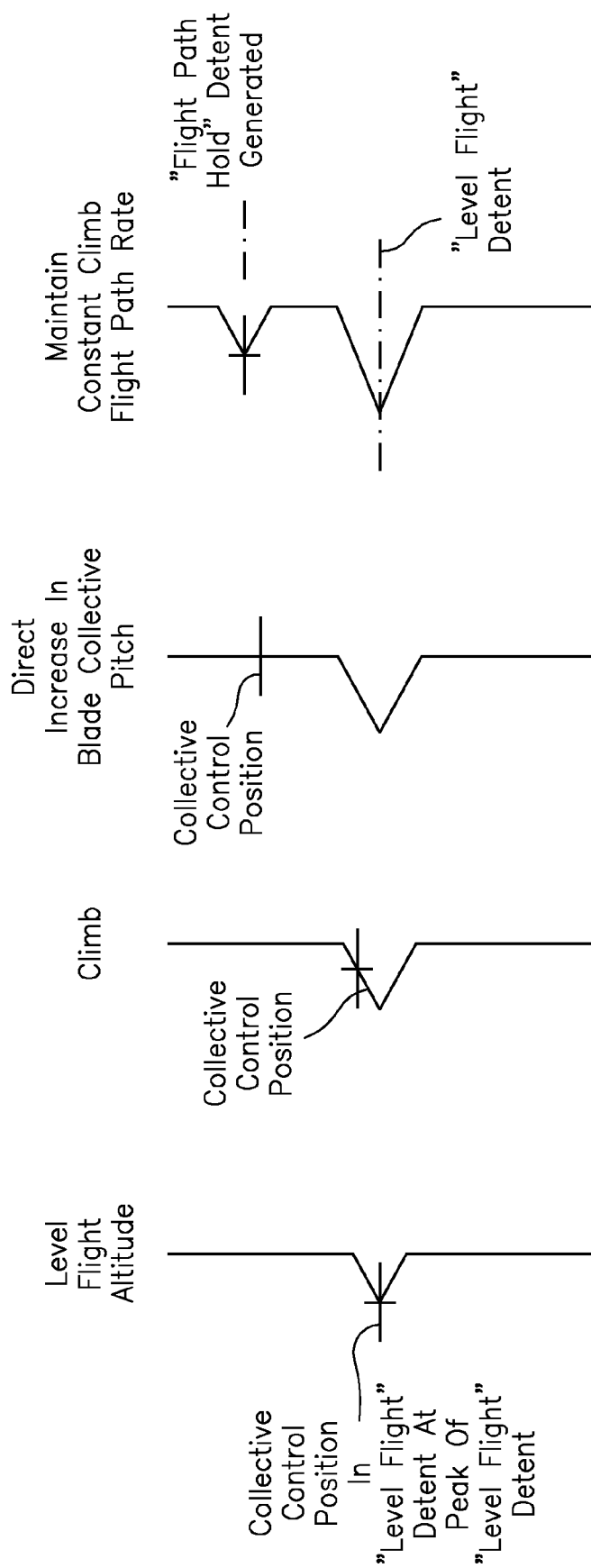
FIG. 5 is a force command range diagram illustrating the position of a collective controller representative of a level flight attitude.
FIG. 6 is a force command range diagram illustrating the position of a collective controller representative of an increasing vertical velocity flight attitude.
FIG. 7 is a force command range diagram illustrating the position of a collective controller representative of a direct increase in blade collective pitch.
FIG. 8 is a force command range diagram illustrating a "flight path hold" detent generated when the position of the collective controller is held for a predetermined time.

The "level flight" detent is dynamically positioned as the active collective system 98 maintains the aircraft in level flight. When no force is applied, the collective controller 18 remains in the middle of the "level flight" detent (FIG. 5). In other words, the active collective system 98 maintains the aircraft in level flight while the collective position command module 60 adjusts the "level flight" detent position and the collective controller 18 which remains within the dynamically adjusted "level flight" detent Should the pilot wish to command aircraft vertical speed (or flight path climb/dive angle at high speed), the pilot applies a constant force with the "level flight" detent, without moving the collective controller 18 out of the "level flight" detent (FIG. 6). That is, the pilot moves the collective controller 18 only a small distance and holds the collective controller 18 within the "level flight" detent. This equates to holding the collective control somewhere within the "<" on the force command diagram. This action commands vertical speed (flight path angle if at high speed) proportional to the amount of force applied to the collective controller 18. It should be understood that "force application" as utilized herein includes holding a relatively small controller displacement within the "<" on the force command range diagram.

Should the pilot wish to change the collective blade pitch directly, the pilot displaces the collective controller 18 out of the "level flight" detent—out the "<" on the force command diagram—by overcoming the small breakout force of the detent to move the collective controller 18 to a new position (FIG. 7). Outside of the "level flight" detent, the force command shaping logic 66 provides a constant friction force over the collective controller 18 position. Outside of the "level flight" detent, the collective blade pitch command is direct and generally proportional to collective controller 18 position.

The collective position command module 60 monitors the collective controller 18 velocity such that when the pilot holds the collective controller 18 outside of the "level flight"

detent for a predetermined time (such as 1 second), the collective position command module 60 acquires a flight path angle reference and generate a "flight path hold" detent (FIG. 8) on the collective controller 18 to hold this reference. The collective controller 18 thereafter remains within the "flight path hold" detent. From within the "flight path hold" detent, the pilot can make small inputs as described above, except that application of a constant force without moving the collective out of the "flight path hold detent" commands a change in the constant flight path rate to which changes the climb/dive angle defined by the "flight path hold" detent. Movement of the collective controller 18 out of the "flight path hold detent" again directly commands blade collective pitch. It should be noted that the "level flight" detent is still being computed, so that the pilot can move the collective controller 18 out of the "flight path hold detent" and place the collective control 18 into the "level flight" detent to level-off the aircraft without reference to instruments or excessive collective adjustment.

Applicant has determined through piloted simulations that the present invention provides a significant increase in handling qualities, reduction in pilot workload and an increase in situation awareness. This module may alternatively be utilized for ground proximity cueing, brownout mitigation and other force feedback situations.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A flight control system for a rotary wing aircraft comprising:
an active collective system in communication with a rotor blade collective pitch control system;
a collective controller having a force feedback system; and
a collective command module in communication with said collective controller to control said active collective system, said collective command module operable to dynamically adjust a "level flight" detent defined by said force feedback system to cue a pilot to a collective position equivalent to a level flight attitude, movement of said collective controller within said "level flight" detent operable to command aircraft vertical velocity and movement of said collective controller out of said "level flight" detent operable to directly command said rotor blade collective pitch control system.

2. The system as recited in claim 1, wherein movement of said collective controller within said "level flight" detent commands vertical aircraft velocity proportional to an applied force.

3. The system as recited in claim 1, wherein said "level flight" detent is generally "<" shaped, an aircraft level flight attitude defined at an apex of said "level flight" detent.

4. The system as recited in claim 1, wherein said collective command module is operable to cue a "flight path hold" detent defined by said force feedback system.

5. The system as recited in claim 4, wherein said "flight path hold" detent is defined by said force feedback system in response to said collective controller being held generally stationary out of said "level flight" detent for a predetermined time period.

6. The system as recited in claim 5, wherein said predetermined time period is one second.

7. The system as recited in claim 5, wherein said "flight path hold" detent holds an aircraft flight path angle relative to aircraft level flight attitude.

8. The system as recited in claim 7, wherein movement of said collective controller within said "flight path hold" detent is operable to command a change to the aircraft flight path angle and movement of said collective controller out of said "flight path hold" detent operable to directly command said rotor blade collective pitch control system.

9. The system as recited in claim 8, wherein movement of said collective controller to said "level flight" detent levels-off the aircraft to the aircraft level flight attitude.

10. The system as recited in claim 1, wherein said rotor blade collective pitch control system controls a collective pitch of a helicopter main rotor system.

11. A method of collective control for a rotary-wing aircraft having an active collective system comprising the steps of:
(A) dynamically adjusting a "level flight" detent through a force feedback system in communication with a collective controller to cue a pilot to a collective position equivalent to a level flight attitude; and
(B) commanding an aircraft vertical velocity in response to movement of the collective controller within the "level flight" detent.

12. A method as recited in claim 11, wherein said step (A) further comprises:
(a) dynamically adjusting the "level flight" detent and the collective control therewith.

13. A method as recited in claim 11, wherein said step (A) further comprises:
(a) defining an apex of the "level flight" detent as an aircraft level flight attitude.

14. A method as recited in claim 11, wherein said step (B) further comprises:
(a) applying force within the "level flight" detent; and
(b) commanding the aircraft vertical velocity proportional to the amount of force applied in said step (a).

15. A method as recited in claim 11, wherein said step (B) further comprises:
(a) acquiring an aircraft altitude reference; and
(b) holding the altitude reference by adjusting the "level flight" detent position.

16. A method as recited in claim 15, wherein said step (a) further comprises:
(1) acquiring the aircraft altitude reference in response to movement of the collective controller to an apex of the "level flight" detent.

17. A method as recited in claim 11, further comprising the steps of:

(C) commanding a direct rotor blade collective pitch in response to movement of the collective controller out of the "level flight" detent;

(D) dynamically adjusting a "flight path hold" detent defined by the force feedback system in response to holding of the collective controller out of the "level flight" detent for a predetermined period of time; and (E) holding an aircraft flight path constant relative to the aircraft level flight attitude in response to said step (D).

18. A method as recited in claim 17, wherein said step (E) further comprises:

(a) applying force within the "flight path hold" detent; and (b) commanding a change in the aircraft flight path angle relative to the aircraft level flight attitude proportional to the amount of force applied in said step (a).

19. A method as recited in claim 18, wherein said step (E) further comprises:

(c) directly commanding rotor blade collective pitch in response to movement of the collective controller out of the "flight path hold" detent.

20. A method as recited in claim 17, further comprising the steps of:

(F) commanding aircraft level flight attitude in response to movement of the collective controller into the "level flight" detent.

21. A method of collective control for a rotary-wing aircraft having an active collective system comprising:

dynamically adjusting a "level flight" detent through a force feedback system in communication with a collective controller to cue a pilot to a collective position equivalent to a level flight attitude;

commanding a vertical aircraft velocity in response to movement of the collective controller within the "level flight" detent; and commanding a direct rotor blade collective pitch in response to movement of the collective controller out of the "level flight" detent.

* * * * *